July 7, 1959  H. L. PENBERTHY ET AL  2,893,708
GLASS HOMOGENIZER
Filed March 17, 1955
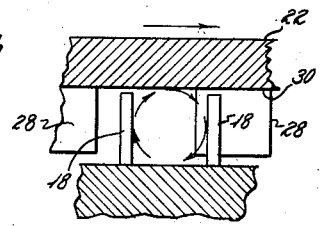
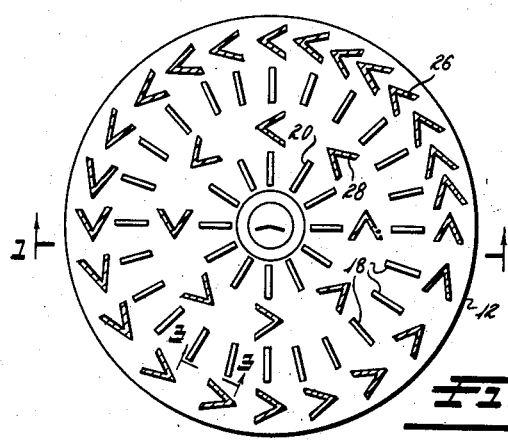
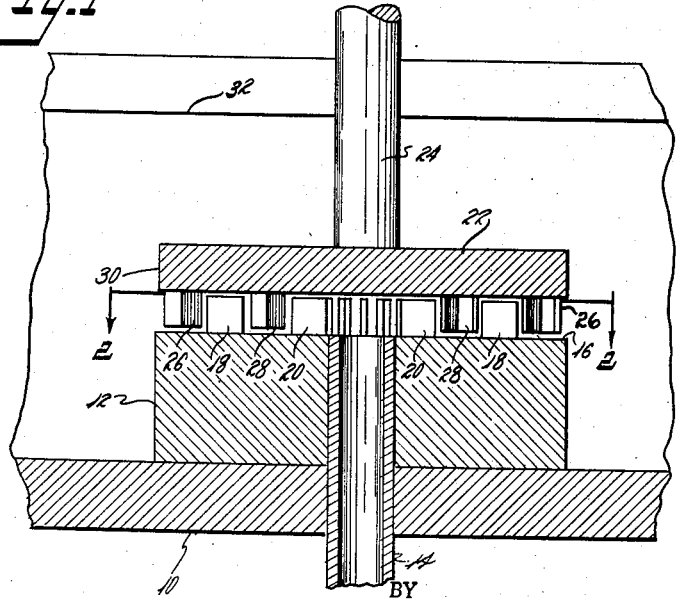

United States Patent Office 2,893,708
Patented July 7, 1959

2,893,708

GLASS HOMOGENIZER

Harvey L. Penberthy, Kenneth P. Hernley, and Harry W. Lohman, Seattle, Wash.; said Hernley and said Lohman assignors to Penberthy Electromelt Company, Seattle, Wash., a corporation of Washington Application March 17, 1955, Serial No. 494,892

4 Claims. (Cl. 259—43)

This invention relates to a means and method for homogenizing glass and more particularly to a glass homogenizer which may be utilized in a large variety of environments.

Molten glass in a furnace or forehearth tends to be non-uniform in temperature and may be inhomogeneous. The portions of such glass next to the bottom and side walls tend to be cooler and more sluggish than the remainder of the glass. The hotter, less viscous glass will flow more readily than the cooler, more sluggish marginal portions of the glass in a channel formed by the latter. Other factors may cause temperature differences and differences of the viscosity between longitudinal portions or component streams of the complete stream or body of glass in the furnace or forehearth. Some of the glass may be contaminated by clay that has been eroded and washed from the walls of the furnace or forehearth. Different longitudinal portions of the glass stream or body may be of different compositions. Longitudinal streaks or thin streams of contaminated glass, or of glass of composition different from the adjacent glass, or inadequately fused glass ingredients, or of other foreign matters tend to persist in the glass so as to be included in the charge fed from the forehearth or furnace. In consequence, the charges of glass obtained are defective and the glass articles made therefrom will likewise be defective and may be unsuitable for the intended use. Such longitudinal streaks or thin streams of refractory contaminated glass or of any other matter which is different in composition from the adjacent glass constitute "cords" or striae in the glass.

Elimination or cords and homogenization of glass are problems which have long received the attention of workers in the glass manufacturing art. Many forms of stirrers and homogenizers for acting on the glass both in and out of the furnace and forehearth has been proposed in attempts to cure these defects, but the results, so far as known to me, have not been entirely satisfactory.

One type of homogenizer which has proven relatively satisfactory and has achieved commercial usage, consists of a cylinder into which a molten charge of glass is introduced from a furnace or forehearth and this cylinder contains a plurality of vertically stacked impellers which are roughly S-shaped in horizontal section. The adjacent impellers are oppositely disposed and all impellers extend to within a very small distance from the walls of the cylinder. Upon rotation there is a strong "mashing" action of the glass against the cylinder wall and there are vertical circulating currents set up between adjacent oppositely disposed impellers which cooperate to homogenize the glass passing therethrough. The glass is withdrawn from the bottom of the cylinder and fed to any desired use.

Homogenizers of this type, i.e., stationary or rotating cylinders inclosing centrally mounted impellers which coact with the cylinder walls, are in rather general use and are illustrated in patents to DeVoe, 2,569,459; Tooley et al., 2,515,478; Hohmann, 2,688,469; Spremulli, 2,570,078; and Wiley et al., 2,515,481. The latter patent also necessitates a screen for effective homogenization.

While these homogenizers provide an effective homogenizing action they require additional containers mounted either within or without the glass furnace and utilize either additional refractories or a large amount of expensive refractory metal. In the former case the glass must pass through additional refractory channels thereby increasing the possibility of picking up stones and other impurities, and in the latter case the cost of the unit is relatively high. Most of the internally mounted units cannot be adapted to existing furnaces without a substantial rebuilding job and the external units require the application of additional heat and require floor space which is oftentimes unavailable.

According to the present invention a homogenizer is provided which requires no separate container and which performs its homogenizing action without acting in conjunction with side walls. The unit may be placed in the fining zone of a furnace, in a forehearth or in any other convenient location where it may be submerged in the molten glass to be homogenized. The mixing action is induced by means of coacting splitters and plates while the glass is confined between adjacently and coaxially arranged rotor and stator elements. The homogenizing action is relatively violent and a high degree of mixing is accomplished. The unit may be readily installed in existing furnaces or forehearths with only a relatively small modification of existent equipment.

It is accordingly an object of the present invention to provide a glass homogenizer of simple construction and relatively low cost which does not require an additional glass container.

It is another object of this invention to provide a glass homogenizer which may be submerged in a body of molten glass in existent containers with a minimum modification of the existent facilities.

It is another object of the present invention to provide a glass homogenizer which homogenizes glass without the necessity of the homogenizing elements coacting with container side walls.

It is another object of the present invention to provide a glass homogenizer which creates a large number of homogenizing currents and which exercise a vigorous glass splitting action.

Other objects and advantages of the present invention will become apparent upon reference to the specification and claims and the appended drawings wherein:

Figure 1 is a vertical section through a homogenizer constructed according to this invention and mounted in an existent glass container taken along the line 1—1 of Figure 2;

Figure 2 is a horizontal section taken along the line 2—2 of Figure 1;

Figure 3 is a fragmentary vertical section taken along the line 3—3 of Figure 2;

Figure 4 is a fragmentary vertical section of another embodiment of splitter, and Figure 5 is a plan view of the splitter of Figure 4 taken along the line 5—5.

Referring more particularly to the figures of the drawings there is shown in Figure 1 a furnace or forehearth floor 10 on which is mounted a refractory stator block 12, the floor 10 and block 12 having aligned apertures therein to receive a glass outlet pipe 14 which is formed of a refractory metal highly impervious to wear such as platinum or molybdenum. On the top 16 of the stator block 12 a plurality of radially or substantially radially disposed plates 18 and 20 are arranged in a concentric circular configuration around the outlet pipe 14.

A rotor 22 is provided above the stator block 12 mounted on a shaft 24 which is rotatably supported in any suitable manner and connected to a driving motor, not shown. A plurality of V-shaped splitters 26 and 28 are mounted upon the underface 30 of the rotor 22 in concentric configurations between and to the outside of plates 18 and 20, as may best be seen in Figure 2. The entire assembly is located below the surface 32 of molten glass above the floor 10 of the glass container.

When the rotor 22 is rotated the splitters 26 and 28 exercise a vigorous splitting action upon the glass in their paths and further force it sideways between the plates 18 and 20. It will be seen that as the rotor 22 moves to the right its undersurface 30 drags along a layer of glass which cooperates with the glass moved by the diverging faces of the splitters 26 and 28 to produce vigorously swirling glass currents between the plates 18 and rotor and stator surfaces, as is indicated by the arrows in Figure 3. While the splitters tend to move glass outwardly therefrom in two directions, glass is being withdrawn through the outlet 14 so that the general glass movement is into the center of the homogenizer. All of the glass is subjected to numerous splitting and mixing actions so that any remaining inhomogeneity is so small that Brownian movement is sufficient to cause its elimination.

Referring to Figure 2 it will be seen that the radially disposed plates 18 and 20 define generally radial passages therebetween. The splitters 26 and 28 have a leading edge which is forwardmost on rotation of the rotor and have a side face which diverges rearwardly from the leading edge towards the adjacent plates, so that when a splitter is athwart one of the radial passages, the leading edge is spaced radially from the circle in which the plates are arranged so that the diverging face permits free access to the passage.

While the splitters shown in the illustrated embodiment of the invention are V-shaped it is also contemplated that other divergent shapes may be utilized.

Thus referring to Figures 4 and 5 there is shown a rotor 34 and a stator 36 having plates 38 mounted thereon. The rotor has splitters 40 mounted on its surface and these are in the form of three dimensional wedges having faces 42 and 44 which diverge in two planes. Thus, with this type splitter, the swirling action of Figure 3 is further accentuated by the additional wedge action of the splitters 40. That is to say the divergence in the planes considerably reinforces the circular swirling motion shown in Figure 3 over that which is obtained with the type of single plane divergence of the splitter illustrated in Figure 2. The leading edge of each splitter is at an acute angle to the surface of the rotor and extends rearwardly from its point of attachment to the rotor surface relative to the rotation of the rotor. The splitting action thus occurs in two separate planes.

In all cases the spacing between rotor and stator faces is not critical although they must be close enough to direct the glass in the generally closed path shown in Figure 3. Where these faces are too widely spaced the closed path swirling action is greatly diminished or lost and the effectiveness of mixing is impaired. It will be obvious that the number of rows of splitters and plates may be increased with a concurrent improvement in homogeneity.

It will be apparent from the foregoing that there has been provided a compact simple homogenizer which exercises a thorough homogenizing action and which may be mounted in any existent furnace or forehearth and does not require a separate container with which the impellers may coact.

The invention may be embodied in other specific forms without departing from the spirit or essential characteristics thereof. The present embodiments are therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed and desired to be secured by United States Letters Patent is:

1. In a glass homogenizer, a rotor mounted for rotation about an axis, a plurality of splitter members mounted on a surface of said rotor, said splitter members being disposed in a circle around said axis, a stator adjacent said surface of said rotor and having an outlet aperture therein, and a plurality of radially disposed plate members arranged substantially in a circle on said stator concentric with said splitter members, said plate members defining generally radial passages therebetween, said splitter members having a leading edge which is forwardmost on rotation of said rotor, the leading edge of each splitter member being at an acute angle to said surface of said rotor so that said leading edge extends rearwardly from its point of attachment to said rotor surface in relation to rotation of said rotor, each splitter member having a side face which diverges rearwardly from said leading edge toward said plate members so that when a splitter member is athwart one of said passages said leading edge is at an acute angle to adjacent plate members and is spaced radially from said circle and is spaced from the nearest plate member so that said rearwardly extending leading edge and said diverging face permits free access to said passage.

2. A homogenizer as set out in claim 1 comprising at least three concentric rows of said members.

3. A homogenizer as set out in claim 2 wherein said three rows of members comprise an outer configuration of plate members, an inner configuration of plate members, and an intermediate configuration of splitter members arranged concentrically between said outer and inner rows of members, said splitter members having side faces diverging rearwardly from said leading edges toward the plate members in said inner and outer configurations of plate members.

4. A homogenizer as set out in claim 3 including a further row of plate members arranged concentrically within said inner row of splitter members.

References Cited in the file of this patent

UNITED STATES PATENTS

| | | |
|---|---|---|
| 1,890,106 | Hendixen | Dec. 6, 1932 |
| 2,321,599 | Hofmann | June 15, 1943 |
| 2,517,149 | Walsh et al. | Aug. 1, 1950 |
| 2,731,253 | Spencer | Jan. 17, 1956 |